US012585885B2

(12) United States Patent
Zhao et al.

(10) Patent No.: US 12,585,885 B2
(45) Date of Patent: Mar. 24, 2026

(54) DIALOGUE MODEL TRAINING METHOD

(71) Applicant: BEIJING BAIDU NETCOM SCIENCE TECHNOLOGY CO., LTD., Beijing (CN)

(72) Inventors: Yanbin Zhao, Beijing (CN); Siyu Ding, Beijing (CN); Shuohuan Wang, Beijing (CN); Yu Sun, Beijing (CN); Hao Tian, Beijing (CN); Hua Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 169 days.

(21) Appl. No.: 18/747,641

(22) Filed: Jun. 19, 2024

(65) Prior Publication Data

US 2024/0412002 A1    Dec. 12, 2024

(30) Foreign Application Priority Data

Jun. 30, 2023    (CN) .......................... 202310802054.9

(51) Int. Cl.
*G06F 40/35*    (2020.01)

(52) U.S. Cl.
CPC .................................. *G06F 40/35* (2020.01)

(58) Field of Classification Search
USPC ................................................... 704/1–504
See application file for complete search history.

(56) References Cited

U.S. PATENT DOCUMENTS

| | | | |
|---|---|---|---|
| 10,540,967 B2 * | 1/2020 | Perez ...................... | G06F 40/35 |
| 2018/0137854 A1 * | 5/2018 | Perez ...................... | G06F 40/35 |
| 2019/0236085 A1 * | 8/2019 | Galitsky ............... | G06F 16/322 |

(Continued)

FOREIGN PATENT DOCUMENTS

| | | |
|---|---|---|
| CN | 111639163 A | 9/2020 |
| CN | 112507099 A | 3/2021 |

(Continued)

OTHER PUBLICATIONS

Xiao Jin et al., "A Semi-Supervised Co-Training Model for Customer Credit Scoring", Chinese Journal of Management Science, vol. 24, No. 6, Jun. 2016, 8 pages.

*Primary Examiner* — Marcus T Riley
(74) *Attorney, Agent, or Firm* — FisherBroyles, LLP

(57) ABSTRACT

A method is provided. The method includes: obtaining a first sample dataset; inputting at least one first question text corresponding to at least one piece of first sample data into a dialog model separately to obtain at least one first answer prediction result; inputting each second question text into the dialog model to obtain a second answer prediction result output by the dialog model; inputting the second answer prediction result into a reward model to obtain a score of the second answer prediction result output by the reward model; determining a comprehensive loss based on the at least one first answer prediction result, a first answer text of each of the at least one piece of first sample data, and a score corresponding to each of at least one piece of second sample data; and adjusting at least one parameter of the dialog model based on the comprehensive loss.

20 Claims, 6 Drawing Sheets

(56)    References Cited

U.S. PATENT DOCUMENTS

| | | | | |
|---|---|---|---|---|
| 2020/0134449 | A1* | 4/2020 | Perez | G06N 3/084 |
| 2021/0174161 | A1* | 6/2021 | Perez | G06N 3/004 |
| 2021/0326524 | A1* | 10/2021 | Zeng | G16H 10/20 |
| 2024/0412002 | A1* | 12/2024 | Zhao | G06F 40/35 |
| 2025/0390517 | A1* | 12/2025 | Wu | G06F 16/3329 |

FOREIGN PATENT DOCUMENTS

| | | | | | |
|---|---|---|---|---|---|
| CN | 113961686 | A | | 1/2022 | |
| CN | 115600646 | A | | 1/2023 | |
| CN | 116303949 | A | | 6/2023 | |
| CN | 116860933 | A | * | 10/2023 | G06F 40/35 |
| CN | 117633196 | A | * | 3/2024 | G06F 18/214 |
| CN | 117633196 | B | * | 4/2024 | G06F 18/214 |
| CN | 116860933 | B | * | 7/2024 | G06F 40/35 |
| EP | 3819809 | A1 | | 5/2021 | |
| EP | 4064110 | A1 | | 9/2022 | |
| JP | 2019192073 | A | * | 10/2019 | G06N 3/045 |
| JP | 2021066991 | A | * | 4/2021 | D01F 6/70 |
| JP | 7099031 | B2 | * | 7/2022 | G06N 3/045 |
| JP | 2023012493 | A | * | 1/2023 | G06V 10/774 |
| JP | 7777059 | B2 | * | 11/2025 | G06F 40/40 |
| WO | 2022099425 | A1 | | 5/2022 | |

* cited by examiner

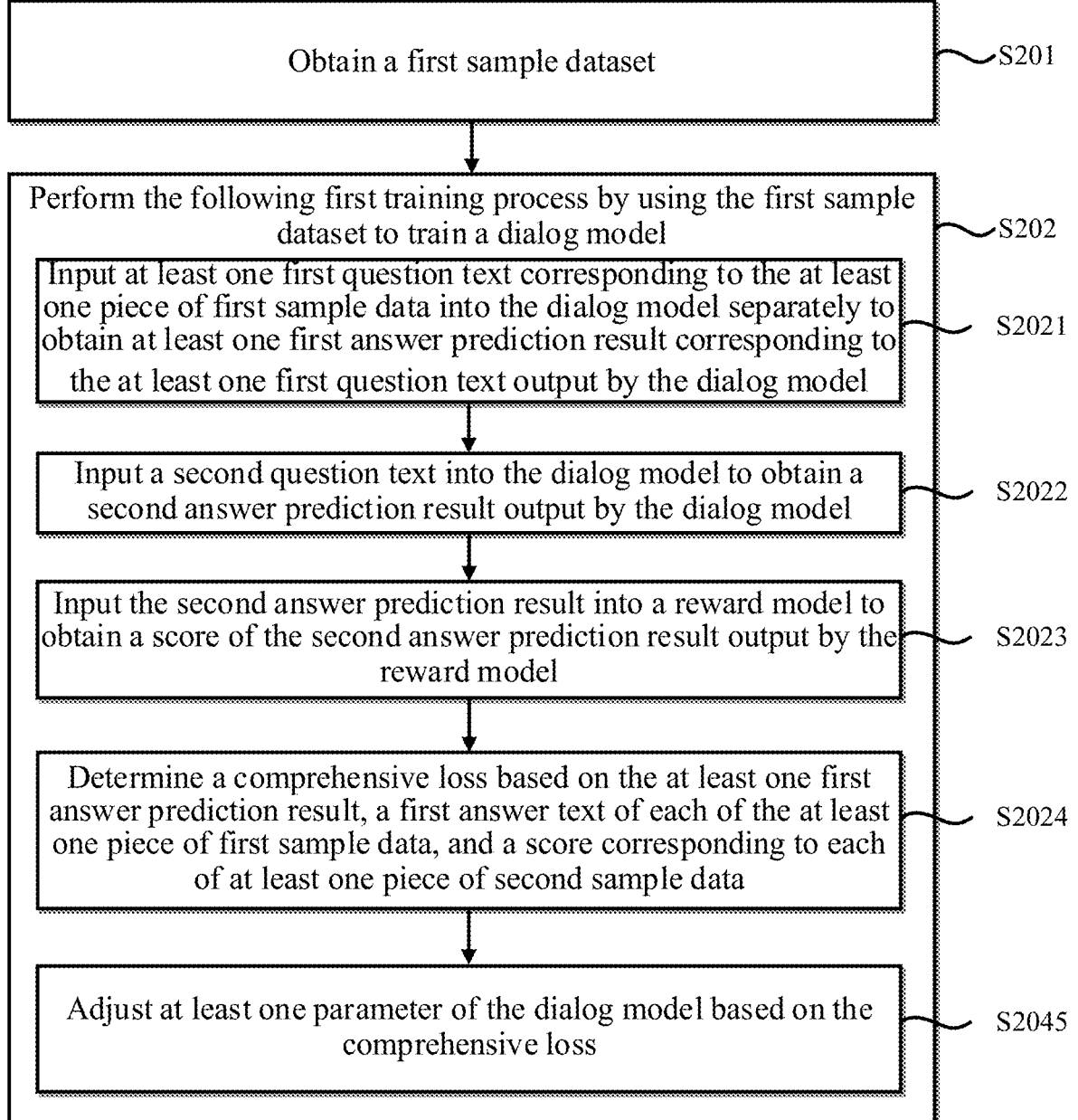

Obtain a first sample dataset — S201

Perform the following first training process by using the first sample dataset to train a dialog model — S202

Input at least one first question text corresponding to the at least one piece of first sample data into the dialog model separately to obtain at least one first answer prediction result corresponding to the at least one first question text output by the dialog model — S2021

Input a second question text into the dialog model to obtain a second answer prediction result output by the dialog model — S2022

Input the second answer prediction result into a reward model to obtain a score of the second answer prediction result output by the reward model — S2023

Determine a comprehensive loss based on the at least one first answer prediction result, a first answer text of each of the at least one piece of first sample data, and a score corresponding to each of at least one piece of second sample data — S2024

Adjust at least one parameter of the dialog model based on the comprehensive loss — S2045

FIG. 2

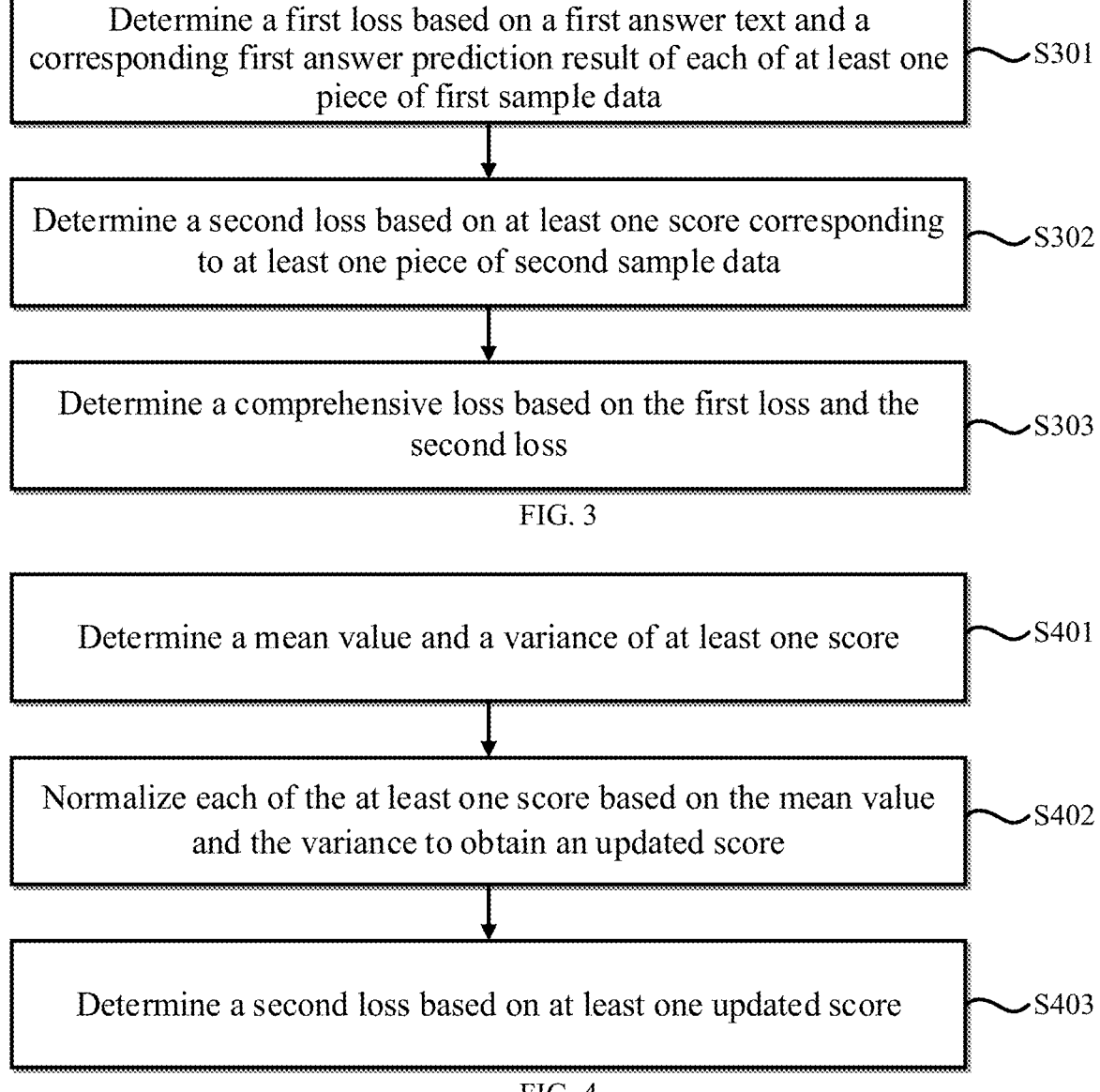

Determine a first loss based on a first answer text and a corresponding first answer prediction result of each of at least one piece of first sample data ~S301

Determine a second loss based on at least one score corresponding to at least one piece of second sample data ~S302

Determine a comprehensive loss based on the first loss and the second loss ~S303

FIG. 3

Determine a mean value and a variance of at least one score ~S401

Normalize each of the at least one score based on the mean value and the variance to obtain an updated score ~S402

Determine a second loss based on at least one updated score ~S403

FIG. 4

Obtain a question text of a user — S601

Input the question text into a dialog model to obtain an answer text generated by the dialog model — S602

DIALOGUE MODEL TRAINING METHOD

CROSS REFERENCE TO RELATED APPLICATION

The present application claims priority to Chinese Patent Application No. 202310802054.9 filed on Jun. 30, 2023, which is incorporated herein by reference in its entirety.

TECHNICAL FIELD

The present disclosure relates to the technical field of artificial intelligence, in particular, to the technical field of natural language processing and intelligent dialog, and specifically to a training method for a dialog model, an electronic device and a computer-readable storage medium.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include the technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

A task-oriented dialog generation technology based on a very large-scale language model is one of current research hotspots in the field of artificial intelligence. This technology can generate dialog content that meets specific task requirements by using the natural language generation ability of the large-scale language model and with reference to specific needs of a task-oriented dialog.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a training method for a dialog model, an electronic device and a computer-readable storage medium.

According to an aspect of the present disclosure, there is provided a training method for a dialog model, including: obtaining a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text; performing the following first training process by using the first sample dataset to train the dialog model: inputting at least one first question text corresponding to the at least one piece of first sample data into the dialog model separately to obtain at least one first answer prediction result corresponding to the at least one first question text output by the dialog model; performing the following operations for the second question text of each of the at least one piece of second sample data: inputting the second question text into the dialog model to obtain a second answer prediction result output by the dialog model; and inputting the second answer prediction result into a reward model to obtain a score of the second answer prediction result output by the reward model, wherein the reward model is obtained through training based on at least one sample question, a plurality of answer texts corresponding to each of the at least one sample question, and a label of each of the plurality of answer texts indicating a user satisfaction degree of the corresponding answer text; determining a comprehensive loss based on the at least one first answer prediction result, the first answer text of each of the at least one piece of first sample data, and the score corresponding to each of at least one piece of second sample data; and adjusting at least one parameter of the dialog model based on the comprehensive loss.

According to another aspect of the present disclosure, there is provided an electronic device, including: one or more processors; and a memory storing one or more programs configured to be executed by the one or more processors, wherein the one or more programs comprising instructions for: obtaining a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text; performing following first training process by using the first sample dataset to train the dialog model: inputting at least one first question text corresponding to the at least one piece of first sample data into the dialog model separately to obtain at least one first answer prediction result corresponding to the at least one first question text output by the dialog model; performing following operations for the second question text of each of the at least one piece of second sample data: inputting the second question text into the dialog model to obtain a second answer prediction result output by the dialog model; and inputting the second answer prediction result into a reward model to obtain a score of the second answer prediction result output by the reward model, wherein the reward model is obtained through training based on at least one sample question, a plurality of answer texts corresponding to each of the at least one sample question, and a label of each of the plurality of answer texts indicating a user satisfaction degree of corresponding answer text; determining a comprehensive loss based on the at least one first answer prediction result, the first answer text of each of the at least one piece of first sample data, and a score corresponding to each of the at least one piece of second sample data; and adjusting at least one parameter of the dialog model based on the comprehensive loss.

According to another aspect of the present disclosure, there is provided a non-transitory computer-readable storage medium, storing one or more programs comprising instructions that, when executed by one or more processors of a computing device, cause the computing device to perform operations comprising: obtaining a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text; performing following first training process by using the first sample dataset to train the dialog model: inputting at least one first question text corresponding to the at least one piece of first sample data into the dialog model separately to obtain at least one first answer prediction result corresponding to the at least one first question text output by the dialog model; performing following operations for the second question text of each of the at least one piece of second sample data: inputting the second question text into the dialog model to obtain a second answer prediction result output by the dialog model; and inputting the second answer prediction result into a reward model to obtain a score of the second answer prediction result output by the reward model, wherein the reward model is obtained through training based on at least one sample question, a plurality of answer texts corresponding to each of the at least one sample question, and a label of each of the plurality of answer texts indicating a user satisfaction degree of corresponding answer text; determining a comprehensive loss based on the at least one first answer prediction result, the first answer text of each of the at least one piece of first sample data, and a score corresponding to each of the at least one piece of second sample data; and adjusting at least one parameter of the dialog model based on the comprehensive loss.

It should be understood that the content described in this section is not intended to identify critical or important features of the embodiments of the present disclosure, and is not used to limit the scope of the present disclosure. Other features of the present disclosure will be readily understood with reference to the following description.

BRIEF DESCRIPTION OF THE DRAWINGS

The accompanying drawings show embodiments and form a part of the specification, and are used to explain implementations of the embodiments together with a written description of the specification. The embodiments shown are merely for illustrative purposes and do not limit the scope of the claims. Throughout the accompanying drawings, the same reference numerals denote similar but not necessarily same elements.

FIG. 2 is a flowchart of a training method for a dialog model according to some embodiments of the present disclosure;

FIG. 3 is a flowchart of determining a comprehensive loss according to some embodiments of the present disclosure;

FIG. 4 is a flowchart of determining a second loss according to some embodiments of the present disclosure;

DETAILED DESCRIPTION OF EMBODIMENTS

Example embodiments of the present disclosure are described below in conjunction with the accompanying drawings, where various details of the embodiments of the present disclosure are included to facilitate understanding, and should only be considered as example. Therefore, those of ordinary skill in the art should be aware that various changes and modifications can be made to the embodiments described here, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one element from the other. In some examples, a first element and a second element may refer to a same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed terms.

The embodiments of the present disclosure will be described below in detail with reference to the accompanying drawings.

Figure 1:
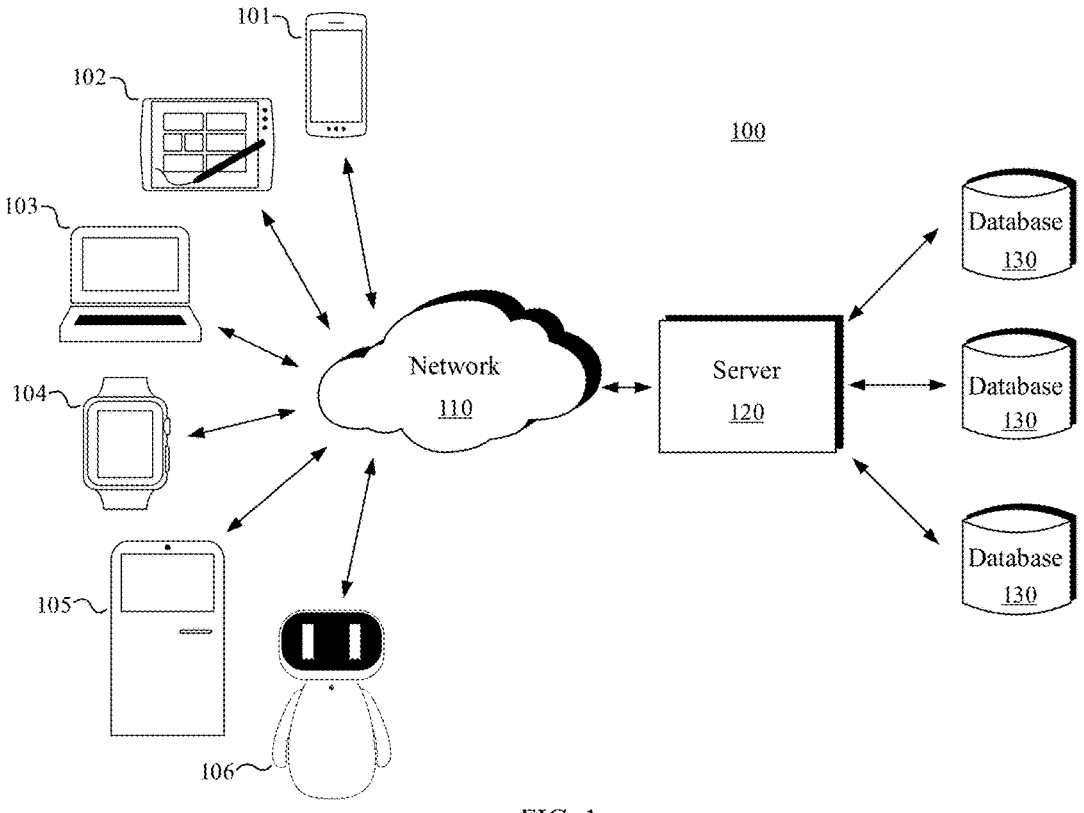
FIG. 1 is a schematic diagram of an example system in which various methods described herein can be implemented, according to some embodiments of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more applications.

In some embodiments of the present disclosure, the server 120 can run one or more services or software applications that enable the above training method for the dialog model or the above answer information generation method implemented based on the dialog model to be performed.

In some embodiments, the server 120 may further provide other services or software applications that may include a non-virtual environment and a virtual environment. In some embodiments, these services may be provided as web-based services or cloud services, for example, provided to a user of the client devices 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client devices 101, 102, 103, 104, 105, and/or 106 may sequentially use one or more client applications to interact with the server 120, to use the services provided by these components. It should be understood that various different system configurations are possible, and may be different from that of the system 100. Therefore, FIG. 1 is an example of the system for implementing various methods described herein, and is not intended to be limiting.

The user may use the client devices 101, 102, 103, 104, 105, and/or 106 to input a dialog text. The client device may provide an interface that enables the user of the client device to interact with the client device. The client device may also output information to the user via the interface. Although FIG. 1 shows only six client devices, those skilled in the art will understand that any number of client devices are supported in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software applications and operating systems, such as MICROSOFT Windows, APPLE iOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or WIFI), and/or any combination of these and/or other networks.

The server 120 may include one or more general-purpose computers, a dedicated server computer (for example, a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105, and/or 106. The server 120 may further include one or more applications to display the data feeds and/or real-time events via one or more display devices of the client devices 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and a video file. The databases 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, such that the various methods and apparatuses described according to the present disclosure can be applied.

According to some embodiments of the present disclosure, as shown in FIG. 2, there is provided a training method for a dialog model, including:

Step S201: Obtain a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text.

Step S202: Perform the following first training process by using the first sample dataset to train the dialog model.

Step S2021: Input at least one first question text corresponding to the at least one piece of first sample data into the dialog model separately to obtain at least one first answer prediction result corresponding to the at least one first question text output by the dialog model.

The following operations are performed for the second question text of each of the at least one piece of second sample data.

Step S2022: Input the second question text into the dialog model to obtain a second answer prediction result output by the dialog model.

Step S2023: Input the second answer prediction result into a reward model to obtain a score of the second answer prediction result output by the reward model, where the reward model is obtained through training based on at least one sample question, a plurality of answer texts corresponding to each of the at least one sample question, and a label of each of the plurality of answer texts indicating a user satisfaction degree of the corresponding answer text.

Step S2024: Determine a comprehensive loss based on the at least one first answer prediction result, the first answer text of each of the at least one piece of first sample data, and the score corresponding to each of at least one piece of second sample data.

Step S2025: Adjust at least one parameter of the dialog model based on the comprehensive loss.

Therefore, losses of supervised fine-tuning training can be introduced into a reinforcement learning stage of the dialog model based on manual feedback, so that the ability to solve dialog tasks learned in a supervised fine-tuning training process is retained in the reinforcement learning stage, and the factual accuracy and user intention understanding ability of the dialog model can be improved, thereby improving an overall answer information generation effect of the dialog model.

In some embodiments, the first sample dataset may include two types of sample data, where each piece of first sample data includes a first question text and a first answer text corresponding to the first question text, and each piece of second sample data includes a second question text.

In some embodiments, the second question text may be the same as a specific first question text in the first sample dataset. In some embodiments, first question texts and second question texts in the first sample dataset may alternatively be different from each other.

In some embodiments, each first question text and second question text may be input into the current dialog model separately, and a corresponding first answer prediction result and a corresponding second answer prediction result may be obtained separately. Subsequently, each second answer prediction result and a second question text corresponding to the second answer prediction result are input into a pre-trained reward model to obtain a score of the second answer prediction result output by the reward model. The score of the second answer prediction result may be used to indicate a user satisfaction degree of the answer information.

In some embodiments, the reward model may be obtained through training based on the following method: Firstly, one or more sample questions are obtained, and the sample questions are sequentially input into the current dialog model, to generate a plurality of answer texts for each sample question, and obtain a label of each answer text based on manual annotation, where the label may indicate a user satisfaction degree of the corresponding answer text. Subsequently, each answer text and a sample question corresponding to the answer text are input into an initial reward model to obtain a prediction result of the model. Subsequently, losses may be calculated based on the prediction results and the corresponding labels, and a model parameter may be adjusted until the reward model converges.

In some embodiments, the reward model may be constructed based on multi-layer perceptron, a neural network, or another architecture.

In some embodiments, the comprehensive loss may be calculated based on the at least one first answer prediction result, the first answer text of each of the at least one piece of first sample data, and a score corresponding to each of the at least one piece of second sample data. For example, in the case that the first question text and the second question text are the same, a weight coefficient of a difference between each first answer prediction result and a corresponding first answer text may be further determined based on a corresponding score after the different is calculated, and the comprehensive loss may be calculated based on one or more differences multiplied by weight coefficients.

In some embodiments, as shown in FIG. 3, the determining a comprehensive loss based on the at least one first answer prediction result, the first answer text of each of the at least one piece of first sample data, and a score corresponding to each of the at least one piece of second sample data may include:

Step S301: Determine a first loss based on the first answer text and a corresponding first answer prediction result of each of the at least one piece of first sample data.

Step S302: Determine a second loss based on at least one score corresponding to the at least one piece of second sample data.

Step S303: Determine the comprehensive loss based on the first loss and the second loss.

Therefore, the comprehensive loss is be obtained by calculating the losses of two parts separately, to realize joint modeling and mutual promotion of the two stages, namely, a supervised fine-tuning training stage for dialog-oriented tasks and a reinforcement learning stage based on manual feedback, so that the ability of the model to understand and follow user instructions can be maintained while the ability of the model to model the degree of liking of the user is improved, thereby improving an overall answer information generation effect of the dialog model.

In some embodiments, the first loss may be determined based on the first answer prediction result of each of the at least one piece of first sample data and the first answer text corresponding to each of the at least one piece of first sample data.

In some embodiments, the difference may be measured based on a cross-entropy loss function or a mean square error loss function.

In some embodiments, the second loss may be a mean value or an expected value of the at least one score corresponding to the at least one second answer prediction result.

In some embodiments, the comprehensive loss may be obtained by combining the losses, alternately minimizing the losses, etc.

In some embodiments, the determining the comprehensive loss based on the first loss and the second loss may include: weighting the first loss and the second loss based on a first preset weight corresponding to the first loss and a second preset weight corresponding to the second loss to obtain the comprehensive loss.

Therefore, the two losses are weighted, so that the impact of two training methods on overall training of the model is controlled by using the weights, and a training effect is ensured.

In some embodiments, in the training stage of the dialog model, a plurality of first sample datasets may be obtained successively, and a plurality of rounds of model training may be performed based on the plurality of first sample datasets.

In some embodiments, with the increase of training rounds, the first preset weight and the second preset weight may be adjusted accordingly when the sum remains unchanged, to adjust a ratio of the loss function in different training rounds, and then control the process of model training. For example, a change factor may be set, and in response to the increase of training rounds, the first preset weight is gradually increased while the second preset weight is gradually reduced based on the change factor, to improve training efficiency of the model while ensuring a training effect of the model.

In some embodiments, as shown in FIG. 4, the determining the second loss based on at least one score corresponding to the at least one piece of second sample data includes:

Step S401: Determine a mean value and a variance of the at least one score.

Step S402: Normalize each of the at least one score based on the mean value and the variance to obtain an updated score.

Step S403: Determine the second loss based on at least one updated score.

Therefore, score distribution in the training process can be further optimized by normalizing scores and then calculating the loss, to avoid the problem that the impact of a reinforcement learning loss on the model is weakened due to the introduction of other losses in the reinforcement learning stage, thereby improving the stability of reinforcement learning, and ensuring the role of the reinforcement learning loss on model training under the framework of joint optimization.

In the reinforcement learning stage, since additional losses are introduced to perform joint training, the increase of the reinforcement learning loss may be inhibited, thus weakening the role that reinforcement learning should play.

In some embodiments, before the second loss is calculated, mean values and variances may be calculated for scores corresponding to all the second answer prediction results in the first sample dataset of the current round. Subsequently, all the scores in this round may be normalized based on the mean values and the variances to obtain normalized scores, and the second loss may be calculated based on the normalized scores.

In some embodiments, a normalization operation for a scores $r_i$ may be expressed based on the following formula:

$$r_i' = (r_i - \bar{r})/std$$

where $$r_i'$$

represents a normalized score, $\bar{r}$ represents a mean value, and std represents a variance.

Therefore, the scores in this round can follow a dynamic standard normal distribution, thus improving the stability of reinforcement learning and ensuring that the reinforcement learning loss can be increased normally under the framework of joint optimization.

In some embodiments, the second loss may be a mean value or an expected value of the normalized scores.

In some embodiments, the training method for the dialog model may further include: obtaining a pre-trained language model and a second sample dataset, wherein the second sample dataset includes at least one piece of third sample data, wherein each of the at least one piece of third sample data includes a third question text and a third answer text, and wherein the pre-trained language model is obtained through training based on a preset quantity of unsupervised sample corpora; and repeating, before training the dialog model by using the first sample dataset, the following training operations for the pre-trained language model based on each piece of third sample data in the second sample dataset until the pre-trained language model converges to obtain an initial dialog model: inputting a third question text corresponding to the third sample data into the pre-trained language model to obtain a third answer prediction result output by the pre-trained language model; and adjusting at least one parameter of the pre-trained language model based on the third answer prediction result and a third answer text corresponding to the third sample data to update the pre-trained language model.

Therefore, before the first training process, supervised fine-tuning training is firstly performed based on the pre-trained language model to obtain the initial dialog model. Subsequently, supervised fine-tuning training and reinforcement learning based on manual feedback are further performed based on the initial dialog model, so that the model obtains the ability to predict user preferences in addition to the ability to solve dialog tasks, thus improving overall performance of the model.

Figures 5, 6:
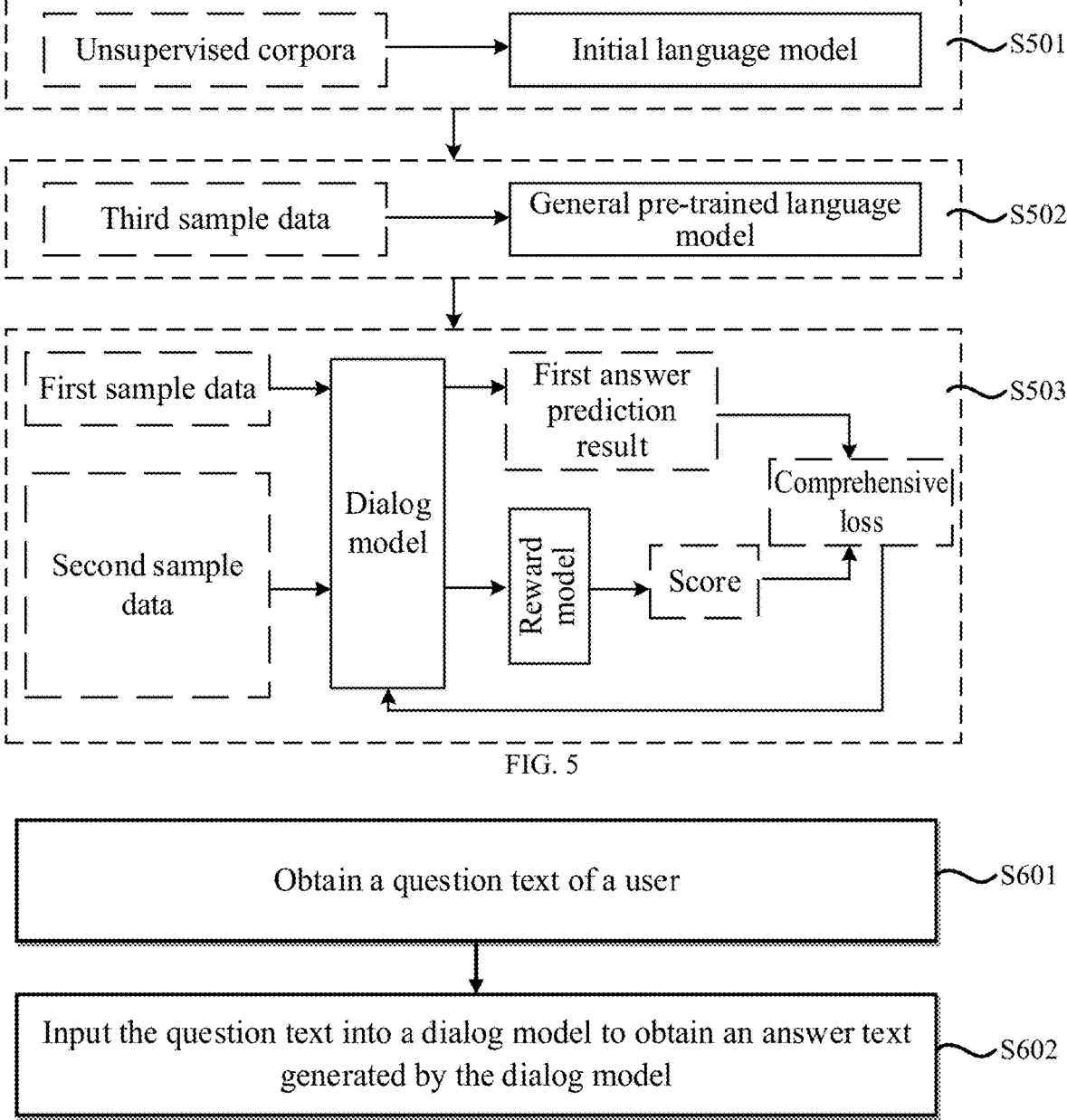
FIG. 5 is a flow block diagram of a training method for a dialog model according to some embodiments of the present disclosure.
FIG. 6 is a flowchart of an answer information generation method implemented based on a dialog model according to some embodiments of the present disclosure.

FIG. 5 is a flow block diagram of a training method for a dialog model according to some embodiments of the present disclosure.

According to some embodiments, as shown in FIG. 5, a dialog model training process may include: Step S501: Perform training of a general pre-trained language model based on unsupervised corpora of a preset scale to obtain the general pre-trained language model. Step S502: Perform supervised fine-tuning training on the general pre-trained language model. Specifically, a second sample data set may be firstly obtained, and third sample data in the second sample dataset may be applied to perform supervised fine-tuning training on the general pre-trained language model, to obtain an initial dialog model that can understand an intention included in a question or an instruction input by the user and provide a relatively high-quality answer based on this intention. Step S503: Train the initial dialog model based on reinforcement learning to obtain a final dialog model, where in this step, a plurality of batches of first sample datasets may be obtained based on the training method described above, and the model may be jointly trained by applying two different types of sample data in the first sample dataset in each round to obtain the final dialog model.

In some embodiments, the third sample data in the second sample dataset and the first sample data in the first sample dataset may be derived from a same pre-prepared sample dataset, and each piece of sample data in the sample dataset has a sample question and answer information corresponding to the sample question. Therefore, the model can maintain the ability to understand the question or the instruction input by the user and the ability to generate high-quality answer information while better predicting user preferences.

In some embodiments, the dialog model is obtained by performing, at least once, a first training process to the initial dialog model, and the training method for the dialog model further includes: inputting a second question text into the initial dialog model to obtain a fourth answer prediction result output by the initial dialog model; and the determining a second loss based on at least one score corresponding to the at least one piece of second sample data includes: determining the second loss based on the at least one score, and a second question text, a second answer prediction result, and a fourth answer prediction result corresponding to each of the at least one piece of second sample data.

Therefore, in the process of calculating the second loss, a regularization term calculated based on the second question text, a second answer prediction result, and a fourth answer prediction result is introduced, so that the stability of model training can be further improved.

In some embodiments, a regularization term may be determined based on a difference between a second answer prediction result and a fourth answer prediction result corresponding to a second question text of each piece of second sample data. Subsequently, the second loss is determined based on the regularization term and a score (or a normalized score) corresponding to the second answer prediction result.

In some embodiments, the regularization term may be calculated based on KL divergence.

In some embodiments, the comprehensive loss may be expressed by the following formula:

$$\text{objective}(\phi) =$$

$$E_{(x,y)\sim D_{\pi_\phi^{RL}}}\left[r_\theta(x, y) - \beta \log\left(\frac{\pi_\phi^{RL}(y\,|\,x)}{\pi^{SFT}(y\,|\,x)}\right)\right] + \gamma E_{(s,t)\sim D_{sft}}\left[\log\left(\pi_\phi^{RL}(t\,|\,s)\right)\right]$$

where $\phi$ is a parameter of a policy function (that is, a parameter of the current dialog model), $$E_{(x,y)\sim D_{\pi_\phi^{RL}}}\left[r_\theta(x, y) - \beta \log\left(\frac{\pi_\phi^{RL}(y\,|\,x)}{\pi^{SFT}(y\,|\,x)}\right)\right]$$

is the second loss, $r_\theta(x,y)$ is a score of a second question text x and a second answer prediction result y, $$\log\left(\frac{\pi_\phi^{RL}(y\,|\,x)}{\pi^{SFT}(y\,|\,x)}\right)$$

is the regularization term, $\pi^{SFT}(y|x)$ represents the probability of obtaining the second answer prediction result y by inputting the second question text x into the initial dialog model, $$\pi_\phi^{RL}(y|x)$$

represents the probability of obtaining the second answer prediction result y by inputting the second question text x into the initial dialog model based on the current dialog model (an updated dialog model obtained after the first training process is performed at least once), and $\beta$ is a hyper-parameter used to control policy update magnitude. $\gamma$ is a weighting coefficient, $$E_{(s,t)\sim D_{sft}}\left[\log\left(\pi_\phi^{RL}(t|s)\right)\right]$$

is the first loss, and $$\log\left(\pi_\phi^{RL}(t|s)\right)$$

represents a cross-entropy for generating a correct answer t in the case of a given input S.

In some embodiments, a first quantity of the at least one piece of first sample data and a second quantity of the at least one piece of second sample data are both plural, and the first quantity and the second quantity meet a preset ratio.

Therefore, by controlling the ratio of the two types of sample data, the impact of two training methods on the model can be controlled in the training process, so that an overall training effect of the model can be optimized.

In some embodiments, the preset ratio of the first quantity to the second quantity may be, for example, 1:7.

In some embodiments, for a plurality of first sample datasets in a plurality of rounds, the ratio of the first quantity to the second quantity may be adjusted with the increase of training rounds, for example, the proportion of the first quantity may be gradually increased. Therefore, training efficiency of the model can be improved while ensuring a training effect of the model.

In some embodiments, for example, the dialog model may be constructed based on a knowledge-enhanced large language model for dialog (e.g., ERNIE bot).

In some embodiments, as shown in FIG. 6, there is provided an answer information generation method implemented based on a dialog model, including: Step S601: Obtain a question text of a user. Step S602: Input the question text into the dialog model to obtain an answer text generated by the dialog model, where the dialog model is obtained through training based on the above training method for the dialog model.

Therefore, applying the dialog model trained by using the above training method can have better fact understanding accuracy and user intention understanding ability, so that answer information that is more in line with user expectations can be generated.

Figure 7:
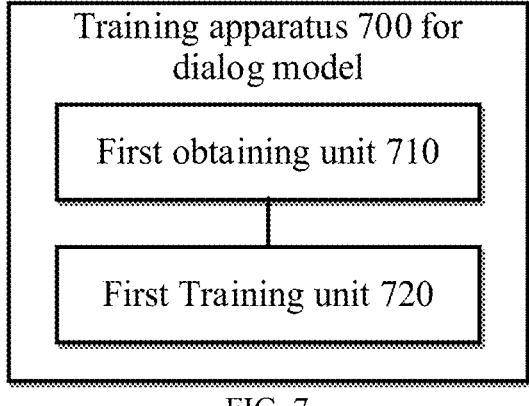
FIG. 7 is a block diagram of a structure of a training apparatus for a dialog model according to some embodiments of the present disclosure.

According to some embodiments, as shown in FIG. 7, there is provided a training apparatus 700 for a dialog model, including:

a first obtaining unit 710 configured to obtain a first sample dataset, where the first sample dataset includes at least one piece of first sample data and at least one piece of second sample data, wherein each of the at least one piece of first sample data includes a first question text and a first answer text, and wherein each of the at least one piece of second sample data includes a second question text; and a first training unit 720 configured to perform the following first training process by using the first sample dataset to train the dialog model:

inputting at least one first question text corresponding to the at least one piece of first sample data into the dialog model separately to obtain at least one first answer prediction result corresponding to the at least one first question text output by the dialog model;

performing the following operations for the second question text of each of the at least one piece of second sample data:

inputting the second question text into the dialog model to obtain a second answer prediction result output by the dialog model; and inputting the second answer prediction result into a reward model to obtain a score of the second answer prediction result output by the reward model, where the reward model is obtained through training based on at least one sample question, a plurality of answer texts corresponding to each of the at least one sample question, and a label of each of the plurality of answer texts indicating a user satisfaction degree of the corresponding answer text;

determining a comprehensive loss based on the at least one first answer prediction result, the first answer text of each of the at least one piece of first sample data, and the score corresponding to each of at least one piece of second sample data; and adjusting at least one parameter of the dialog model based on the comprehensive loss.

In some embodiments, the determining a comprehensive loss based on the at least one first answer prediction result, the first answer text of each of the at least one piece of first sample data, and a score corresponding to each of the at least one piece of second sample data may include: determining a first loss based on the first answer text and a corresponding first answer prediction result of each of the at least one piece of first sample data; determining a second loss based on at least one score corresponding to the at least one piece of second sample data; and determining the comprehensive loss based on the first loss and the second loss.

In some embodiments, the determining a second loss based on at least one score corresponding to the at least one piece of second sample data may include: determining a mean value and a variance of the at least one score; normalizing each of the at least one score based on the mean value and the variance to obtain an updated score; and determining the second loss based on at least one updated score.

In some embodiments, the determining the comprehensive loss based on the first loss and the second loss may include: weighting the first loss and the second loss based on a first preset weight corresponding to the first loss and a second preset weight corresponding to the second loss to obtain the comprehensive loss.

In some embodiments, the training apparatus may further include: a second obtaining unit configured to obtain a pre-trained language model and a second sample dataset, wherein the second sample dataset includes at least one piece of third sample data, wherein each of the at least one piece of third sample data includes a third question text and a third answer text, and wherein the pre-trained language model is obtained through training based on a preset quantity of unsupervised sample corpora; and a second training unit configured to repeat, before training the dialog model by using the first sample dataset, the following training operations for the pre-trained language model based on each piece of third sample data in the second sample dataset until the pre-trained language model converges to obtain an initial dialog model: inputting a third question text corresponding to the third sample data into the pre-trained language model to obtain a third answer prediction result output by the pre-trained language model; and adjusting at least one parameter of the pre-trained language model based on the third answer prediction result and a third answer text corresponding to the third sample data to update the pre-trained language model.

In some embodiments, the dialog model is obtained by performing, at least once, the first training process to the initial dialog model, and the training apparatus may further include: a third obtaining unit configured to input, for the second question text of each of the at least one piece of second sample data, the second question text into the initial dialog model to obtain a fourth answer prediction result output by the initial dialog model; and the determining a second loss based on at least one score corresponding to the at least one piece of second sample data includes: determining the second loss based on the at least one score, and the second question text, a second answer prediction result, and a fourth answer prediction result corresponding to each of the at least one piece of second sample data.

In some embodiments, a first quantity of the at least one piece of first sample data and a second quantity of the at least one piece of second sample data are both plural, and the first quantity and the second quantity meet a preset ratio.

Figure 8:
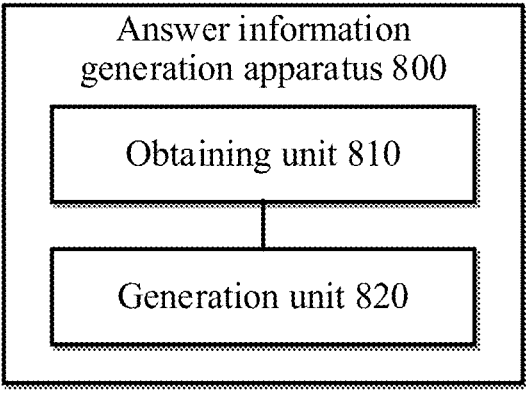
FIG. 8 is a block diagram of a structure of an answer information generation apparatus implemented based on a dialog model according to some embodiments of the present disclosure.

In some embodiments, as shown in FIG. 8, there is further provided an answer information generation apparatus 800 implemented based on a dialog model, including: an obtaining unit 810 configured to obtain a question text of a user; and a generation unit 820 configured to input the question text into the dialog model to obtain an answer text generated by the dialog model, where the dialog model is obtained through training based on the above training method for the dialog model.

According to some embodiments of the present disclosure, an electronic device, a readable storage medium, and a computer program product are further provided.

Figure 9:
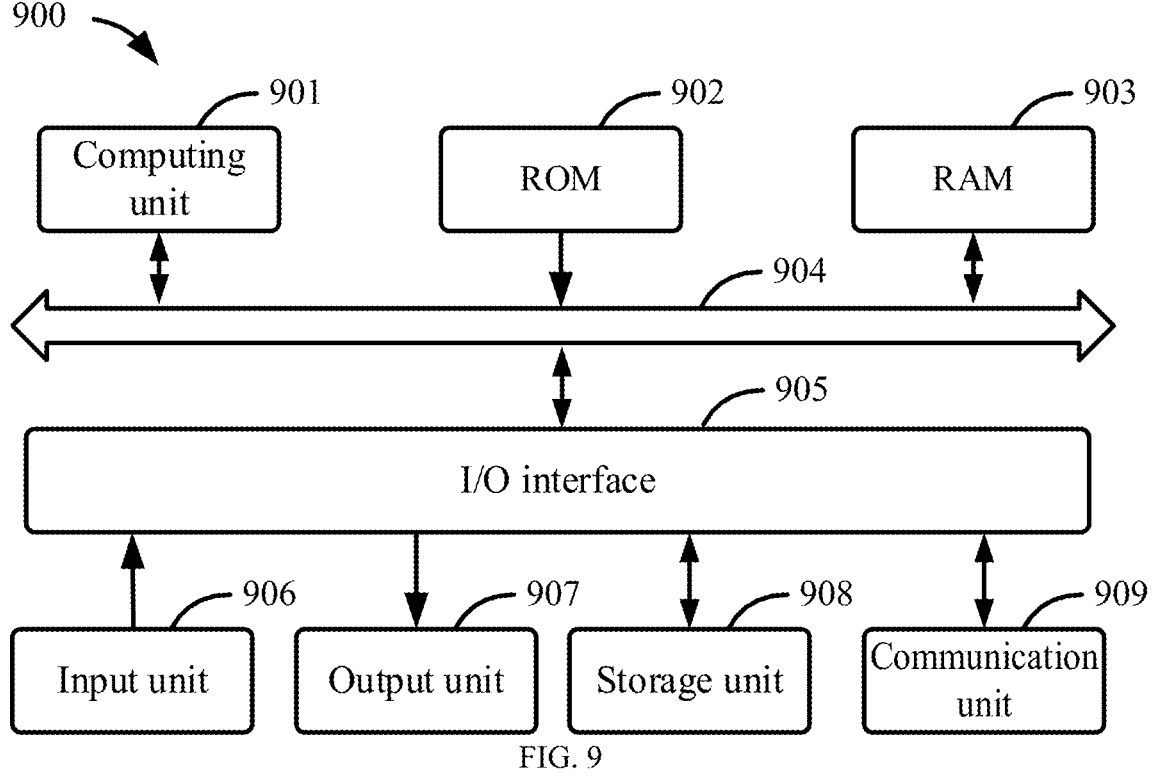
FIG. 9 is a block diagram of a structure of an example electronic device that can be used to implement embodiments of the present disclosure.

Referring to FIG. 9, a block diagram of a structure of an electronic device 900 that can serve as a server or a client of the present disclosure is now described. The electronic device 900 is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 9, the electronic device 900 includes a computing unit 901. The computing unit may perform various appropriate actions and processing according to a computer program stored in a read-only memory (ROM) 902 or a computer program loaded from a storage unit 908 to a random access memory (RAM) 903. The RAM 903 may further store various programs and data required for the operation of the electronic device 900. The computing unit 901, the ROM 902, and the RAM 903 are connected to each other through a bus 904. An input/output (I/O) interface 905 is also connected to the bus 904.

A plurality of components in the electronic device 900 are connected to the I/O interface 905, including: an input unit 906, an output unit 907, the storage unit 908, and a communication unit 909. The input unit 906 may be any type of device capable of entering information to the electronic device 900. The input unit 906 may receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 907 may be any type of device capable of presenting information, and may include, but is not limited to, a display, a speaker, a video/audio output terminal, a vibrator, and/or a printer. The storage unit 908 may include, but is not limited to, a magnetic disk and an optical disk. The communication unit 909 allows the electronic device 900 to exchange information/data with other devices via a computer network such as the Internet and/or various telecommunications networks, and may include, but is not limited to, a modem, a network interface card, an infrared communications device, a wireless communications transceiver, and/or a chipset, for example, a Bluetooth device, an 802.11 device, a Wi-Fi device, a WiMax device, or a cellular communication device.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 901 performs various methods and processing described above, such as the above training method for the dialog model or the above answer information generation method implemented based on the dialog model. For example, in some embodiments, the above training method for the dialog model or the above answer information generation method implemented based on the dialog model may be implemented as a computer software program, which is tangibly contained in a machine-readable medium, such as the storage unit 908. In some embodiments, a part or all of the computer program may be loaded and/or installed onto the electronic device 900 via the ROM 902 and/or the communication unit 909. When the computer program is loaded onto the RAM 903 and executed by the computing unit 901, one or more steps of the above training method for the dialog model or the above answer information generation method implemented based on the dialog model can be performed. Alternatively, in other embodiments, the computing unit 901 may be configured, by any other suitable means (for example, by means of firmware), to perform the above training method for the dialog model or the above answer information generation method implemented based on the dialog model.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flow-charts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), and the Internet.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A training method for a dialog model, comprising:
obtaining a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text;
performing following first training process by using the first sample dataset to train the dialog model:
inputting at least one first question text corresponding to the at least one piece of first sample data into the dialog model separately to obtain at least one first answer prediction result corresponding to the at least one first question text output by the dialog model;
performing following operations for the second question text of each of the at least one piece of second sample data:
inputting the second question text into the dialog model to obtain a second answer prediction result output by the dialog model; and
inputting the second answer prediction result into a reward model to obtain a score of the second answer prediction result output by the reward model, wherein the reward model is obtained through training based on at least one sample question, a plurality of answer texts corresponding to each of the at least one sample question, and a label of each of the plurality of answer texts indicating a user satisfaction degree of corresponding answer text;
determining a comprehensive loss based on the at least one first answer prediction result, the first answer text of each of the at least one piece of first sample data, and a score corresponding to each of the at least one piece of second sample data; and
adjusting at least one parameter of the dialog model based on the comprehensive loss.

2. The method according to claim 1, wherein the determining the comprehensive loss based on the at least one first answer prediction result, the first answer text of each of the at least one piece of first sample data, and the score corresponding to each of the at least one piece of second sample data comprises:
determining a first loss based on the first answer text and a corresponding first answer prediction result of each of the at least one piece of first sample data;
determining a second loss based on at least one score corresponding to the at least one piece of second sample data; and determining the comprehensive loss based on the first loss and the second loss.

3. The method according to claim 2, wherein the determining the second loss based on the at least one score corresponding to the at least one piece of second sample data comprises:
determining a mean value and a variance of the at least one score;
normalizing each of the at least one score based on the mean value and the variance to obtain an updated score; and
determining the second loss based on at least one updated score.

4. The method according to claim 3, wherein the determining the comprehensive loss based on the first loss and the second loss comprises:
weighting the first loss and the second loss based on a first preset weight corresponding to the first loss and a second preset weight corresponding to the second loss to obtain the comprehensive loss.

5. The method according to claim 4, further comprising:
obtaining a pre-trained language model and a second sample dataset, wherein the second sample dataset includes at least one piece of third sample data, wherein each of the at least one piece of third sample data includes a third question text and a third answer text, and wherein the pre-trained language model is obtained through training based on a preset quantity of unsupervised sample corpora; and
repeating, before training the dialog model by using the first sample dataset, following training operations for the pre-trained language model based on each piece of third sample data in the second sample dataset until the pre-trained language model converges, to obtain an initial dialog model:
inputting the third question text corresponding to a piece of third sample data into the pre-trained language model to obtain a third answer prediction result output by the pre-trained language model; and
adjusting at least one parameter of the pre-trained language model based on the third answer prediction result and a third answer text corresponding to the piece of third sample data to update the pre-trained language model.

6. The method according to claim 5, wherein the dialog model is obtained by performing, at least once, the first training process to the initial dialog model, and wherein the method further comprises:
inputting, for the second question text of each of the at least one piece of second sample data, the second question text into the initial dialog model to obtain a fourth answer prediction result output by the initial dialog model; and wherein
the determining the second loss based on the at least one score corresponding to the at least one piece of second sample data comprises:
determining the second loss based on the at least one score, and the second question text, the second answer prediction result, and the fourth answer prediction result corresponding to each of the at least one piece of second sample data.

7. The method according to claim 6, wherein a first quantity of the at least one piece of first sample data and a second quantity of the at least one piece of second sample data are both plural, and wherein the first quantity and the second quantity meet a preset ratio.

8. An electronic device, comprising:

one or more processors; and a memory storing one or more programs configured to be executed by the one or more processors, wherein the one or more programs comprising instructions for:

obtaining a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text;

performing following first training process by using the first sample dataset to train a dialog model:

inputting at least one first question text corresponding to the at least one piece of first sample data into the dialog model separately to obtain at least one first answer prediction result corresponding to the at least one first question text output by the dialog model;

performing following operations for the second question text of each of the at least one piece of second sample data:

inputting the second question text into the dialog model to obtain a second answer prediction result output by the dialog model; and inputting the second answer prediction result into a reward model to obtain a score of the second answer prediction result output by the reward model, wherein the reward model is obtained through training based on at least one sample question, a plurality of answer texts corresponding to each of the at least one sample question, and a label of each of the plurality of answer texts indicating a user satisfaction degree of corresponding answer text;

determining a comprehensive loss based on the at least one first answer prediction result, the first answer text of each of the at least one piece of first sample data, and a score corresponding to each of the at least one piece of second sample data; and adjusting at least one parameter of the dialog model based on the comprehensive loss.

9. The electronic device according to claim 8, wherein the determining the comprehensive loss based on the at least one first answer prediction result, the first answer text of each of the at least one piece of first sample data, and the score corresponding to each of the at least one piece of second sample data comprises:

determining a first loss based on the first answer text and a corresponding first answer prediction result of each of the at least one piece of first sample data;

determining a second loss based on at least one score corresponding to the at least one piece of second sample data; and determining the comprehensive loss based on the first loss and the second loss.

10. The electronic device according to claim 9, wherein the determining the second loss based on the at least one score corresponding to the at least one piece of second sample data comprises:

determining a mean value and a variance of the at least one score;

normalizing each of the at least one score based on the mean value and the variance to obtain an updated score; and determining the second loss based on at least one updated score.

11. The electronic device according to claim 10, wherein the determining the comprehensive loss based on the first loss and the second loss comprises:

weighting the first loss and the second loss based on a first preset weight corresponding to the first loss and a second preset weight corresponding to the second loss to obtain the comprehensive loss.

12. The electronic device according to claim 11, wherein the one or more programs further comprising instructions for:

obtaining a pre-trained language model and a second sample dataset, wherein the second sample dataset includes at least one piece of third sample data, wherein each of the at least one piece of third sample data includes a third question text and a third answer text, and wherein the pre-trained language model is obtained through training based on a preset quantity of unsupervised sample corpora; and repeating, before training the dialog model by using the first sample dataset, following training operations for the pre-trained language model based on each piece of third sample data in the second sample dataset until the pre-trained language model converges, to obtain an initial dialog model:

inputting the third question text corresponding to a piece of third sample data into the pre-trained language model to obtain a third answer prediction result output by the pre-trained language model; and adjusting at least one parameter of the pre-trained language model based on the third answer prediction result and a third answer text corresponding to the piece of third sample data to update the pre-trained language model.

13. The electronic device according to claim 12, wherein the dialog model is obtained by performing, at least once, the first training process to the initial dialog model, and wherein the one or more programs further comprising instructions for:

inputting, for the second question text of each of the at least one piece of second sample data, the second question text into the initial dialog model to obtain a fourth answer prediction result output by the initial dialog model; and wherein the determining the second loss based on the at least one score corresponding to the at least one piece of second sample data comprises:

determining the second loss based on the at least one score, and the second question text, the second answer prediction result, and the fourth answer prediction result corresponding to each of the at least one piece of second sample data.

14. The electronic device according to claim 13, wherein a first quantity of the at least one piece of first sample data and a second quantity of the at least one piece of second sample data are both plural, and wherein the first quantity and the second quantity meet a preset ratio.

15. A non-transitory computer-readable storage medium, storing one or more programs comprising instructions that, when executed by one or more processors of a computing device, cause the computing device to perform operations comprising:

obtaining a first sample dataset, wherein the first sample dataset includes at least one piece of first sample data and at least one piece of second sample data, wherein each of the at least one piece of first sample data includes a first question text and a first answer text, and wherein each of the at least one piece of second sample data includes a second question text;

performing following first training process by using the first sample dataset to train a dialog model:

inputting at least one first question text corresponding to the at least one piece of first sample data into the dialog model separately to obtain at least one first answer prediction result corresponding to the at least one first question text output by the dialog model;

performing following operations for the second question text of each of the at least one piece of second sample data:

inputting the second question text into the dialog model to obtain a second answer prediction result output by the dialog model; and inputting the second answer prediction result into a reward model to obtain a score of the second answer prediction result output by the reward model, wherein the reward model is obtained through training based on at least one sample question, a plurality of answer texts corresponding to each of the at least one sample question, and a label of each of the plurality of answer texts indicating a user satisfaction degree of corresponding answer text;

determining a comprehensive loss based on the at least one first answer prediction result, the first answer text of each of the at least one piece of first sample data, and a score corresponding to each of the at least one piece of second sample data; and adjusting at least one parameter of the dialog model based on the comprehensive loss.

16. The non-transitory computer-readable storage medium according to claim 15, wherein the determining the comprehensive loss based on the at least one first answer prediction result, the first answer text of each of the at least one piece of first sample data, and the score corresponding to each of the at least one piece of second sample data comprises:

determining a first loss based on the first answer text and a corresponding first answer prediction result of each of the at least one piece of first sample data;

determining a second loss based on at least one score corresponding to the at least one piece of second sample data; and determining the comprehensive loss based on the first loss and the second loss.

17. The non-transitory computer-readable storage medium according to claim 16, wherein the determining the second loss based on the at least one score corresponding to the at least one piece of second sample data comprises:

determining a mean value and a variance of the at least one score;

normalizing each of the at least one score based on the mean value and the variance to obtain an updated score; and determining the second loss based on at least one updated score.

18. The non-transitory computer-readable storage medium according to claim 17, wherein the determining the comprehensive loss based on the first loss and the second loss comprises:

weighting the first loss and the second loss based on a first preset weight corresponding to the first loss and a second preset weight corresponding to the second loss to obtain the comprehensive loss.

19. The non-transitory computer-readable storage medium according to claim 18, wherein the operations further comprising:

obtaining a pre-trained language model and a second sample dataset, wherein the second sample dataset includes at least one piece of third sample data, wherein each of the at least one piece of third sample data includes a third question text and a third answer text, and wherein the pre-trained language model is obtained through training based on a preset quantity of unsupervised sample corpora; and repeating, before training the dialog model by using the first sample dataset, following training operations for the pre-trained language model based on each piece of third sample data in the second sample dataset until the pre-trained language model converges, to obtain an initial dialog model:

inputting the third question text corresponding to a piece of third sample data into the pre-trained language model to obtain a third answer prediction result output by the pre-trained language model; and adjusting at least one parameter of the pre-trained language model based on the third answer prediction result and a third answer text corresponding to the piece of third sample data to update the pre-trained language model.

20. The non-transitory computer-readable storage medium according to claim 19, wherein the dialog model is obtained by performing, at least once, the first training process to the initial dialog model, and wherein the operations further comprises:

inputting, for the second question text of each of the at least one piece of second sample data, the second question text into the initial dialog model to obtain a fourth answer prediction result output by the initial dialog model; and wherein the determining the second loss based on the at least one score corresponding to the at least one piece of second sample data comprises:

determining the second loss based on the at least one score, and the second question text, the second answer prediction result, and the fourth answer prediction result corresponding to each of the at least one piece of second sample data.

* * * * *